United States Patent [19]

Drygas, III

[11] 4,397,496
[45] Aug. 9, 1983

[54] VEHICULAR AND PASSENGER TRANSPORTATION SYSTEM

[76] Inventor: Thomas C. J. Drygas, III, 3928 Tara Hall Dr., Jacksonville, Fla. 32211

[21] Appl. No.: 203,419

[22] Filed: Nov. 3, 1980

[51] Int. Cl.³ .................... B62D 27/00; B65G 67/02
[52] U.S. Cl. .................... 296/1 S; 296/64; 410/4
[58] Field of Search .................... 180/22; 410/1, 3, 4; 296/1 S, 64

[56] References Cited

U.S. PATENT DOCUMENTS

| 3,285,194 | 11/1966 | Clejan | 410/4 |
| 3,584,584 | 6/1971 | Milenkovic | 410/1 |
| 3,711,146 | 1/1973 | Madzsar et al. | 296/1 S |
| 3,785,514 | 1/1974 | Forsyth et al. | 410/1 |
| 4,142,755 | 3/1979 | Keedy | 296/1 S |
| 4,201,415 | 5/1980 | Suchanek | 296/1 S |

Primary Examiner—Joseph F. Peters, Jr.
Assistant Examiner—Ross Weaver
Attorney, Agent, or Firm—Robert S. Auten

[57] ABSTRACT

A leading self-propelled vehicle with accommodations for passengers is drivable, under the control of an operator, over roadways and has a rearwardly directed portion designed to provide for selective hitching to a trailer adapted to receive and transport self-propelled vehicles accompanying the passengers. A flexible connection can be provided between the leading vehicle and the trailer to provide, in conjunction with a protective cover on the trailer, for streamline flow of air around the trailer.

2 Claims, 8 Drawing Figures

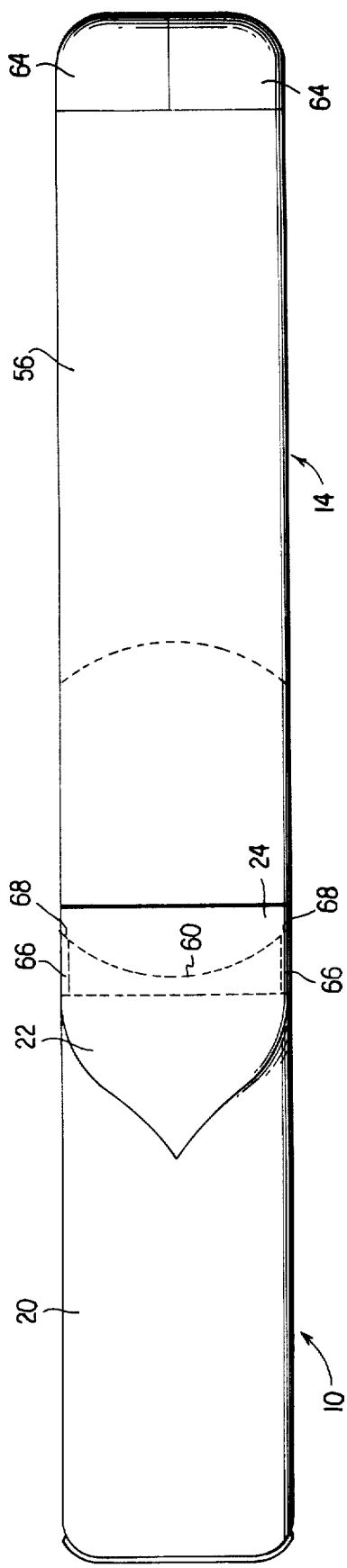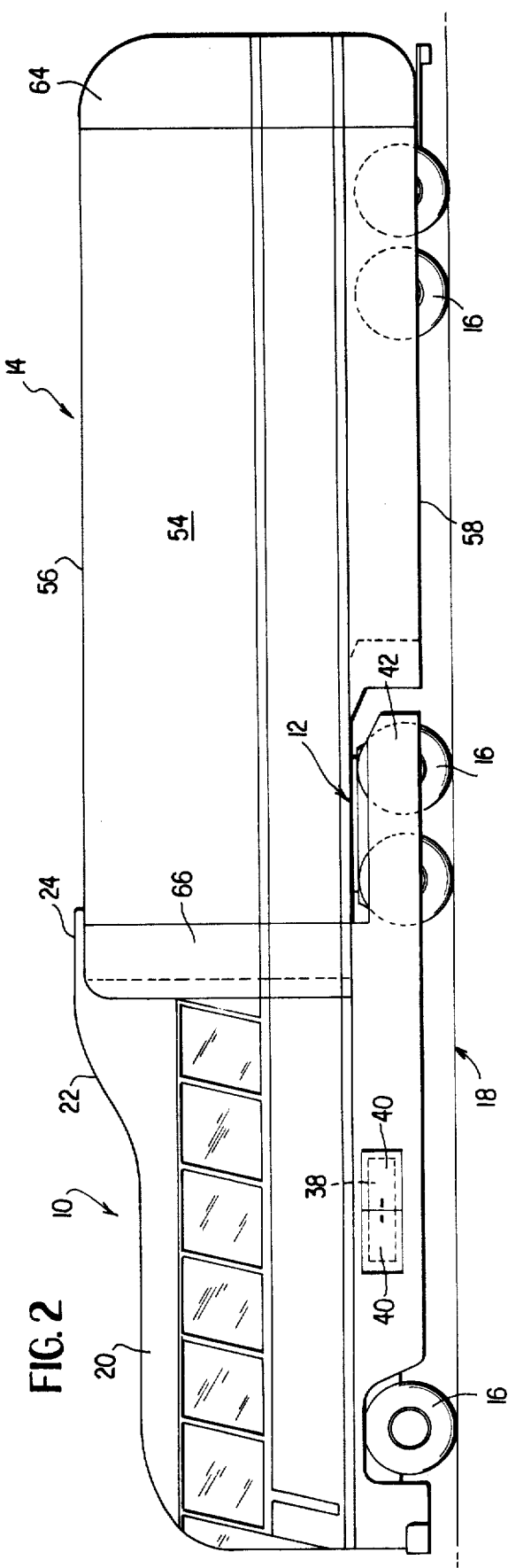

VEHICULAR AND PASSENGER TRANSPORTATION SYSTEM

BACKGROUND OF THE INVENTION

With not only the increased costs involved in the use of automobiles running on gasolene or diesel fuels, but because of the increasing dependence of this country on foreign countries for the supply of oil for these fuels, efforts are being made to cut down the consumption of such fuels and to promote the increased supply of fuels from our own country as well as the development of new technologies.

One way which seems to have promise in the area of reduced fuel consumption is to cut down to the number of automobiles which are used daily for transporting a few passengers per car, often only the driver, over the roadways of the country and to rely more on the use of public or mass transportation systems utilizing buses, trains, etc.

Public transportation systems such as those mentioned above often serve well in providing transportation for large numbers of passengers in the local areas and in movements involving longer distances. There is a considerable saving of fuel as compared to the amount of fuel required in the use of many automobiles.

Obviously a person using a public transportation system loses some degree of mobility as compared to the situation where he uses an automobile. These public systems are almost always laid out to operate over fixed routes and with designated loading and unloading areas or stops. These routes and stops maybe, in many cases, perfectly acceptable to some passengers but, on the other hand, many may find the choices available to them just do not satisfy their transportation needs and many tend to fall back on the use of their own automobiles.

An additional factor which, it would seem, affects the decision as to whether or not to use a transportation system carrying large numbers of passengers is the need for additional transportation from the passenger's point of departure from such public system to the point or points which he wants to reach. The person must also consider the efforts involved in reaching a point where he can utilize the public transportation system.

The above-mentioned considerations with respect to mobility at departure and arrival points interconnected by public transportation systems appears to be a real factor in the decision by many to use the automobile for travelling relatively long distances on vacation trips or trips for various personal needs. To some extent the desired mobility can be maintained after using a mass transportation system during one or more legs of a trip by relying on facilities presently available. Thus car rental systems do provide means for achieving mobility but are not always available and, of course, there are the costs involved. Taxis are another means which can be utilized.

Another factor which apparently influences a traveler's decision as to whether or not he should use his automobile on a trip is the load he must take with him. If a small amount of baggage is involved it may be fairly easy to interchange between public transportation or mass transportation systems and other systems available at departure and destination points. On the other hand this may be difficult and expensive if a large amount of baggage and/or other loads need to be carried.

In view of the above it seems that there would be many advantages to providing means whereby a number of passengers could be carried between points on a public transportation system and at the same time their automobiles could accompany them for use as desired before utilizing the system or after leaving the system. Applicant is aware that this is accomplished to a limited extent today, as for example, by an auto and train service which, it is understood, operates between Florida and northern points. The automobiles of travellers are loaded on the train at a departure point and the travellers board the train as passengers. The automobiles are then ready for the passengers when they leave the train. It is further understood that a limited number of other train routes are available and others are contemplated.

A limiting factor in the large scale use of the train and auto concept is the fact that there are many localities which are no longer, or ever were, connected by rail lines. On the other hand most localities are connected through a network of roadways and because of this the present invention provides many benefits heretofore not available to travellers.

The concept of transporting passengers with their automobiles over the roadways of this country has been developed, to some extent, by others and the inventor is aware of the transportation systems disclosed in the Forsyth et al U.S. Pat. Nos. 3,933,258, issued on Jan. 20, 1976, and 3,785,514, issued on Jan. 15, 1974. As disclosed by these patents a transporter vehicle carries a plurality of electrically driven passenger vehicles, with the passenger riding therein, over highways and roads. The vehicles are available for the passengers at loading and unloading points.

BRIEF SUMMARY AND OBJECTS OF THE INVENTION

The present invention differs materially from those systems previously mentioned above, or any other system known to the inventor. Briefly the present invention provides for a self-propelled lead vehicle, in the form of a bus having present day comforts and accommodations for passengers, which is adapted to be driven, under the control of a driver, over roadways. At the rear of this lead vehicle there is provided, as an integral part of such vehicle, a portion of a coupling arrangement whereby the vehicle can be selectively hitched to a trailer having another portion of the coupling arrangement and designed to receive and carry a plurality of automobiles or other vehicles such as motorocycles, bicycles, etc. If desired means disposed between the vehicle and trailer can be provided to streamline air flow around the trailer.

The automobiles or other types of vehicles are loaded on the trailer at designated loading points. The driver or operator leaves his automobile or vehicle and enters the bus as a passenger.

After the process of loading of both passengers and automobiles or other vehicles is completed the driver directs the lead vehicle and its towed trailer away from the loading point along a route over roadways to a designated stop where passengers alight from the bus and retrieve their automobiles or other vehicles from the trailer.

Therefore it is an object of the invention to provide a system and apparatus whereby a relatively large number of people can be transported over roadways in a self-propelled vehicle and, when desired, a trailer designed to carry vehicles of the people can be hitched to this vehicle so as to provide for transportation of these people before embarking on the vehicle and after leaving the vehicle.

A further object of the invention is to provide an arrangement between the vehicle and trailer so as to ensure that there is a streamline air flow around the trailer when it is being towed.

Before proceeding with a more detailed description of the invention whereby the inventor seeks to achieve the above-described objects it is desirable to mention some additional advantages of the system.

Certainly not only is there saving in fuel consumption but the wear and tear involved in road travel of the vehicles being carried on the trailer is reduced. Also in this connection there will be less air pollution and congestion on the roadways will be reduced.

In addition by providing for passenger comfort through the present system an alternate transportation system is provided for those who prefer not to travel by air, particularly when a passenger's car can accompany him. With modern bus accommodations longer trips can be made non-stop so that the time involved is relatively short.

While the following description will be confined to a system involving the transportation of automobiles in the trailer it should be understood the trailer can be designed to carry other vehicles, such as motorcycles, which use fuels and bicycles.

DESCRIPTIONS OF THE DRAWINGS

FIG. 1 is a top plan view of the lead vehicle, or bus, as coupled to a vehicle trailer.

FIG. 2 is a side elevational view of the vehicles seen in FIG. 1.

DESCRIPTION OF PREFERRED EMBODIMENT OF INVENTION

Figure 3:
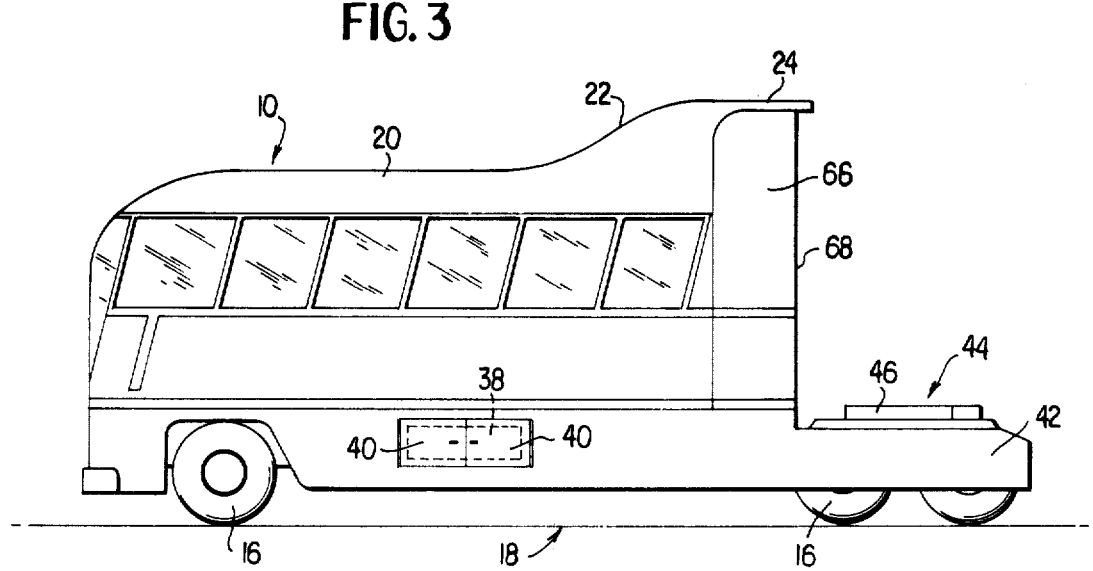
FIG. 3 is a side elevational view of the lead vehicle seen in FIGS. 1 and 2.

As seen in FIGS. 1 and 2 a self-propelled lead vehicle, generally indicated at 10, hereinafter referred to in this description as a bus section, is connected through a coupling arrangement, generally indicated by reference numeral 12, to a vehicle trailer, which is generally indicated at 14. Both the bus section 10 and vehicle trailer 14 are supported on wheels 16 for guided movement over road surfaces such as that indicated by reference numeral 18.

Looking additionally at FIGS. 3 and 4 it can be seen that bus section 10 has a roof 20 which is flaired upwardly at its rear portion, as at 22, to merge with a relatively flat portion 24 to provide for streamline air flow in conjunction with the vehicle trailer 14, as will be described below.

The bus section 10 is constructed to provide comfortable transportation for passengers in accordance with modern day standards. Such construction is, of course, well known and therefore not all details will be set down here. It is believed to be sufficient for this disclosure to point out some of the features such as those set forth below.

Figure 4:
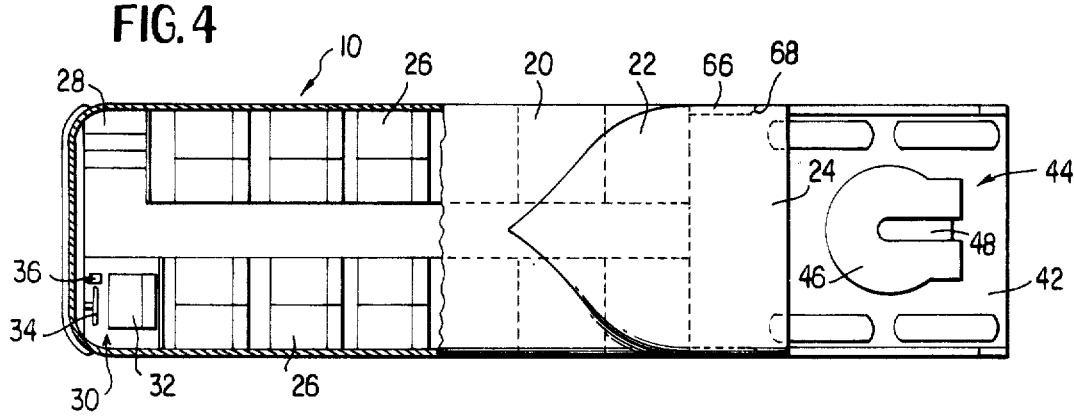
FIG. 4 is a top plan of the lead vehicle with a portion of the roof broken away to expose the passenger area and the operating area.

The bus section has a passenger accommodations area with number of seating areas for passengers as illustrated in diagrammatic form at 26, and as best seen in FIG. 4. These areas can include reclining chairs, shelves, trays, etc., none of which are shown on the drawing. Steps 28 for boarding and leaving the bus section 10 are shown toward the front, although they may be placed at any desired location, and these steps open to the passenger accommodations area with its seating areas 26 and to an operations area, generally designated by reference numeral 30.

The operations area 30 has a seat diagrammatically shown at 32 for an operator and at steering wheel 34 and a brake control means 36, such as a pedal, which the operator uses to steer the bus and for braking it. The steering wheel and brake control means are connected with a steering system and a braking system, respectively, neither of which are shown but which can be of known design as used on buses today.

With respect to the propulsion means for the bus section this too can be of known present day design and can be located as desired. For example it can be an internal combustion engine in the lower portion of the bus section as diagrammatically shown at 38 and access doors can be provided as at 40. Suitable well known control means associated with the propulsion means, such as a gear changer, ignition control, fuel control etc., none of which are shown, are provided for the operation in the operations area 30.

While not shown other features, designed for the comfort of the passengers, can be provided in the bus to include toilet areas, usually provided, snack areas or vending machines, movie facilities etc.

At the rear of the bus section 10 a support portion 42 extends rearwardly and is adapted to support a portion of the coupling arrangement 12 previously mentioned. Such coupling arrangement must provide for the articulated movement of the bus section 10 and vehicle trailer 14 with respect to each other and design considerations such as length of the trailer, overhang of the trailer weight etc., will dictate the exact placement of a receiving portion, generally shown at 44, and the specific design of this receiving portion of the coupling arrangement 12.

Figure 6:
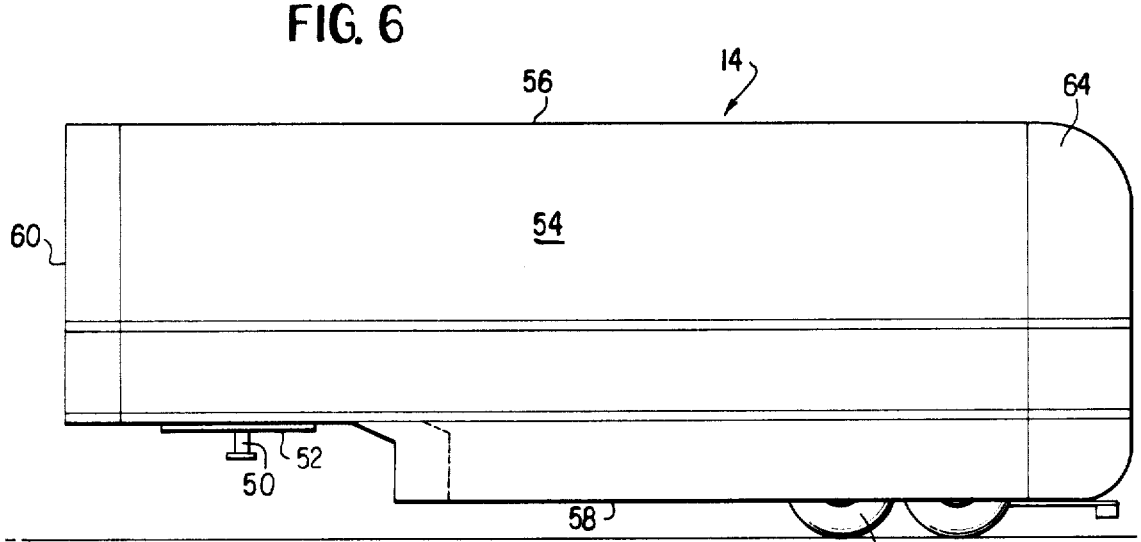
FIG. 6 is a side elevational view of the vehicle trailer.

A suitable arrangement can be the well known fifth wheel arrangement used in coupling tractors to trailers for over the road hauling. This type of coupling has been used for many years and includes generally, as seen in the drawing, a plate support 46 with an entrance slot 48 designed to receive a pin 50 projecting below a plate 52 carried toward the front end of vehicle trailer 14 as seen in FIG. 6. Suitable locking means, not shown lock the pin 50 and plate 52 lies over plate support 46 for relative movement thereon.

Figure 5:
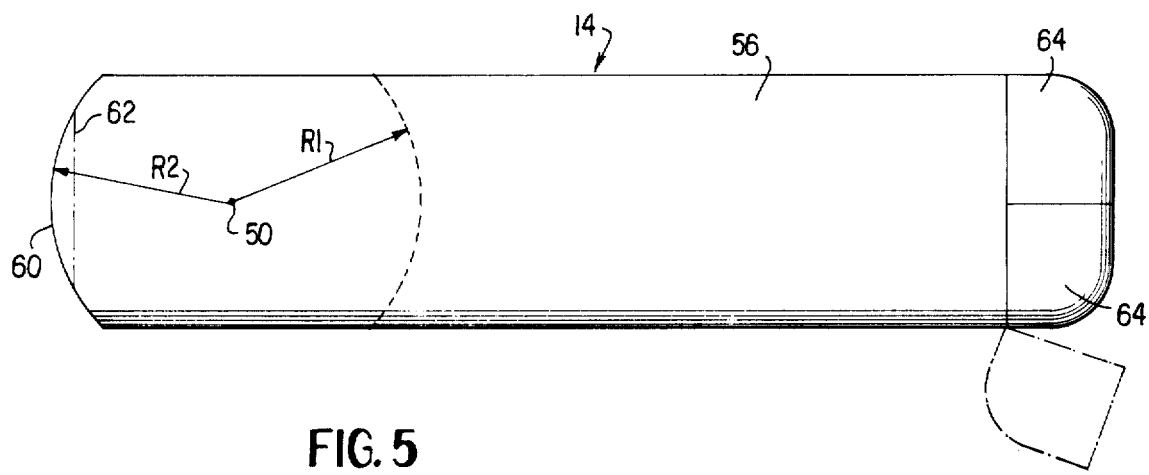
FIG. 5 is a top plan view of the vehicle trailer.
Figure 7:
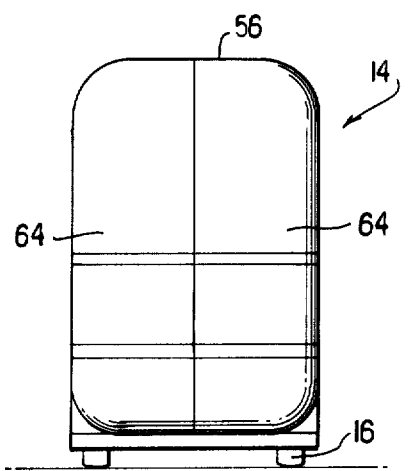
FIG. 7 is an end elevational view of the vehicle trailer.

Looking next at FIGS. 5-7 it is apparent that the vehicle trailer is of generally box-like configuration having at its front end a portion of the coupling arrangement 12 previously described and being supported on wheels 16 at its rear end. An outer skin of light weight metal, plastic or other material meeting design requirements is supported on a framework, not shown, to provide side walls 54, roof 56 and lower wall 58.

Figure 8:
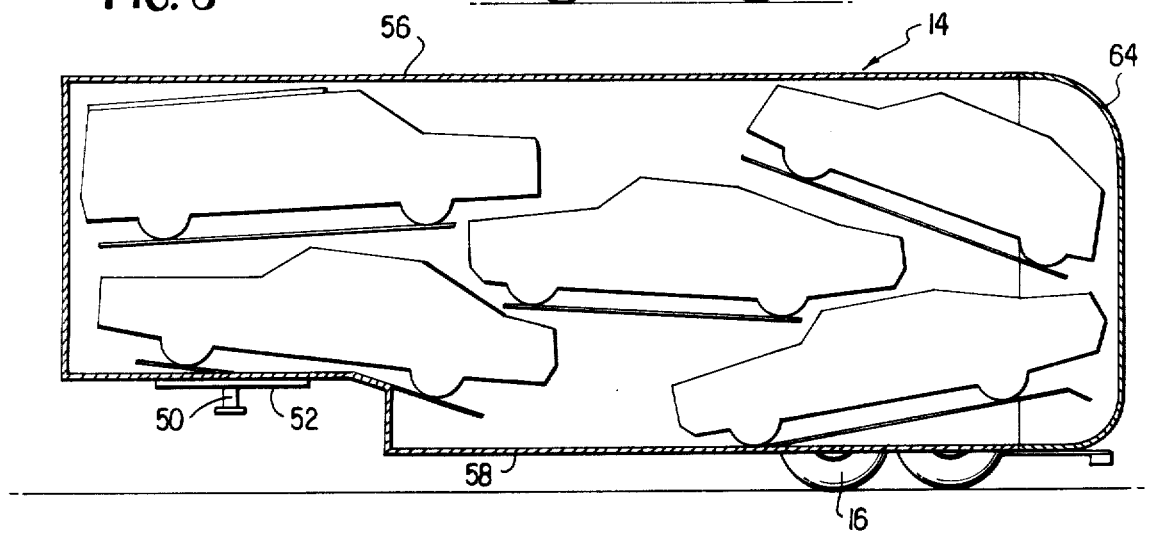
FIG. 8 is a side elevational view of the vehicle trailer with a side cover removed to show one arrangement of automobiles loaded within the trailer.

As generally described above the vehicle trailer is of well known construction, except perhaps for the outer skin, and provides a trailer into which vehicles, such as automobiles, can be loaded, as seen in FIG. 8, for movement over roadways. While the automobiles shown in FIG. 8 are shown diagrammatically as being supported on racks or similar structure the details of the cooperation between the supporting structure and the trailer framework and chassis is not shown. It is not felt that this is necessary as trailers for receiving automobiles and transporting them are well known and design of such a trailer for use within the particular scope of this invention is well within the capabilities of the person skilled in the art.

It should be pointed out however that while the drawing does show, in FIG. 5, a closed front wall 60, this wall can be opened up, if desired, to provide for connections of wires, lines etc., from the bus section, along the dashed line 62. This opening could also provide for front end loading and unloading.

Closing the rear of the vehicle trailer 14 are a pair of clam shell like doors 64 which provides for aerodynamic air flow at the rear end of the trailer. However considerations of cost and easy construction may require that such doors be flat.

As the vehicle trailer 14 will be close to the passengers in the bus section 10 it may be necessary to provide special features on this trailer to reduce noise. These could be in the form of insulation, special air suspension systems etc., none of which are shown.

Looking back to FIGS. 1 and 2, it will be appreciated that the front end of the vehicle trailer 14 is received, when the trailer is in a coupled position, underneath the relatively flat portion 24 of the roof of bus section 10. This ensures that, when taken in conjunction with the smooth roof 56 of the trailer, there is a streamline flow of air over the top of the trailer when the trailer is being towed.

To provide for a streamline flow of air along the side walls 54 of the trailer vertically disposed coupling pieces 66 are secured along their inner verticle seams to the bus section 10 at respective side walls 68 and in smooth continuation rearwardly of these walls as seen best in FIG. 4. These coupling pieces are stiff-like but also possess a degree of flexibility and can be of rubber-like material or other material as required by design specifications. As seen in FIGS. 1 and 4 the outer vertically upstanding edge 68 is contoured to fit smoothly to the front wall 60 of the trailer 14. This front wall 60 has a forwardly directed surface in the form of an arc with a radius $R_2$ from the longitudinal center line of pin 50, as seen in FIG. 5. As also shown in that figure and in FIG. 6 the lower portion of the vehicle trailer 14 is curved on an arc with radius $R_1$. This is done to prevent interference between the frames of the bus 10 and trailer 14. Both these radius are taken from the pin 50.

Other types of coupling for a streamline flow back of the bus section 10 could be a window shade type where the roller is fixed to the bus section 10 and the shade material is selectively pulled across to a connection on the trailer. Again an inverted U-shaped hoop could be used and the material is somewhat flexible. While the coupling pieces can be, in some circumstances, rigid such rigidity tends to prevent some relative motion between the bus section 10 and trailer 14.

What I claim is:

1. A system for transporting passengers and their accompanying vehicles over roadways comprising:
  a. a bus section having at least a power means, a steering means, and a braking means, said bus section being supported on wheels and being capable of self-propelled movement, under the control of an operator in an operations area, over the roadways, said operations area being located at the front of said bus section and providing the accommodations area for the operator, said operations area having a seat supporting the operator in close proximity to said steering and braking means, said bus section also having a passenger accommodation area with a plurality of seating areas for passengers, said seating areas being sequentially arranged in rows extending rearwardly from said operations area;
  b. a trailer including a body structure supported on wheels for movement over roadways and having means receiving a plurality of vehicles and retaining such vehicles within said body structure during movement of said trailer;
  c. coupling means removably coupling said bus section to said trailer including a first portion fixed to and rearwardly directed from said bus section and a second portion fixed to and forwardly directed from said trailer, whereby said trailer is attachable to said bus section in towable relationship thereto and whereby, when said bus section and said trailer are in attached relationship the passengers can occupy the accommodation area and their vehicles are loadable on said trailer for simultaneous movement of the passengers and vehicles.

2. A system as defined in claim 1 wherein flexible means are removably disposed, in continuation rearwardly of side walls of said bus section, between said bus section and said trailer adjacent said coupling means and, in association with a relatively flat portion projecting rearwardly from said bus section, provide for a streamline flow of air around said flexible means and said relatively flat portion during movement of said bus section and said trailer over the roadways.

* * * * *